Figure 1:
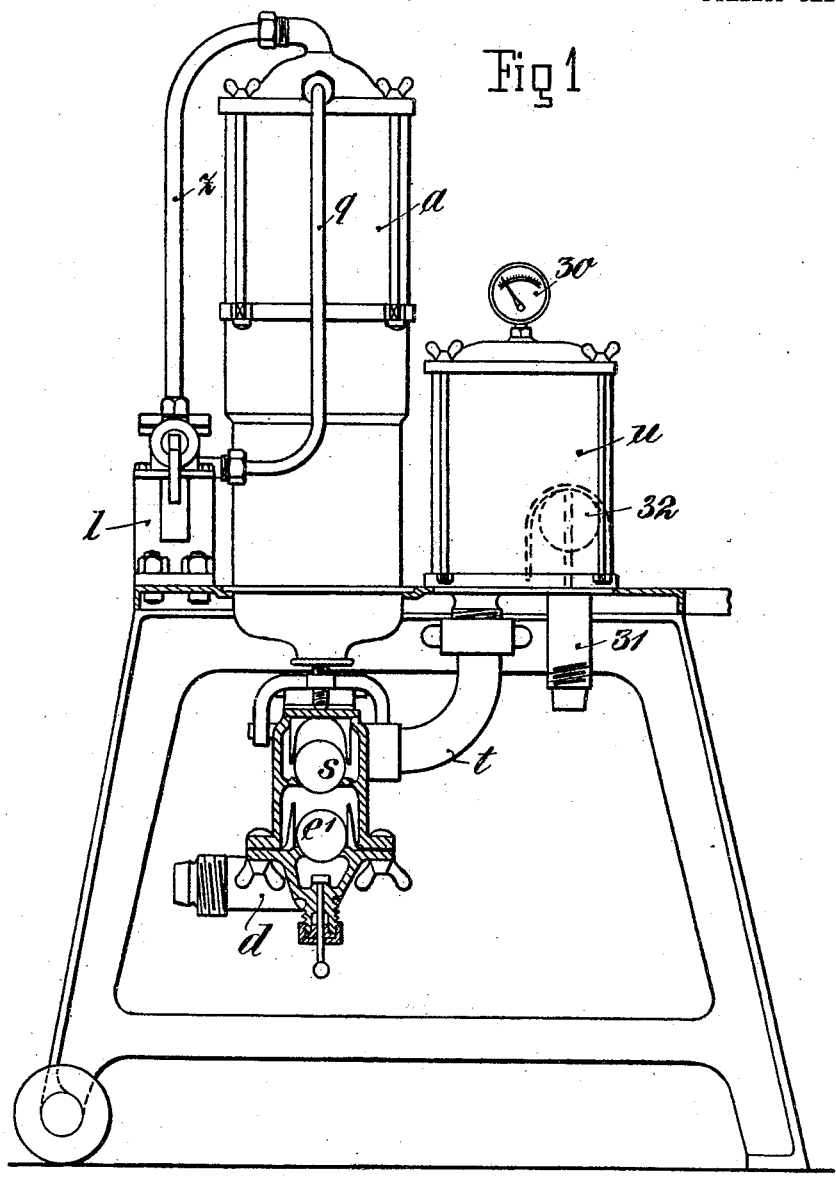

J. H. W. ORTMANN & C. W. C. HERBST.
DEVICE FOR RAISING AND CONVEYING BEER FROM STORAGE VESSELS BY THE DIRECT INFLUENCE OF AIR PRESSURE OF VARIABLE STRENGTH.
APPLICATION FILED DEC. 4, 1906.

925,219.

Patented June 15, 1909.
4 SHEETS—SHEET 1.

Witnesses

Inventors
John Henry William Ortmann
and Carl Wilhelm Cornelius Herbst.

Attorneys

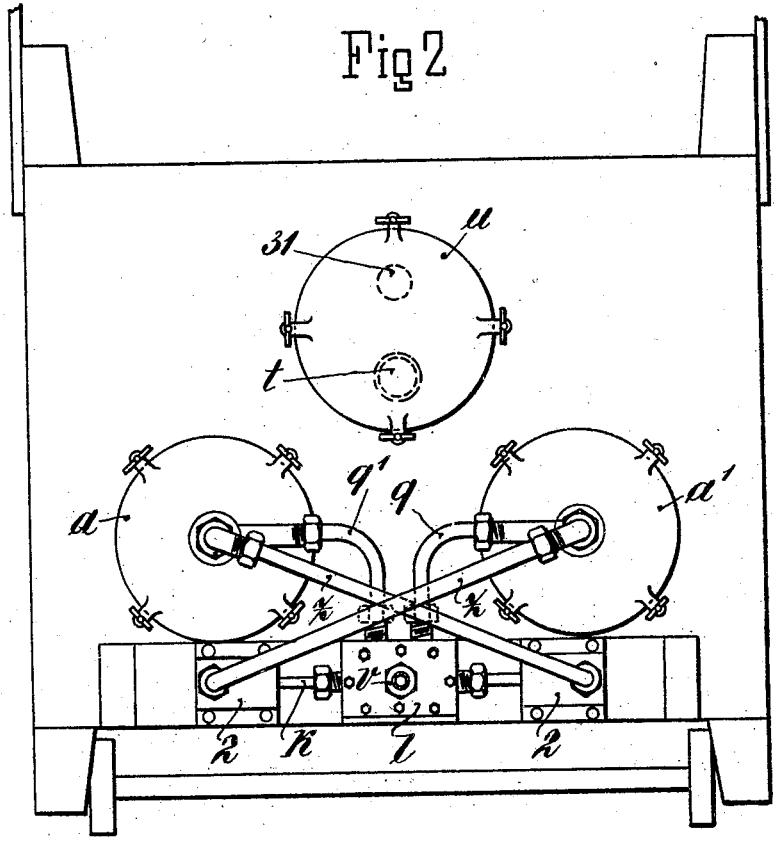

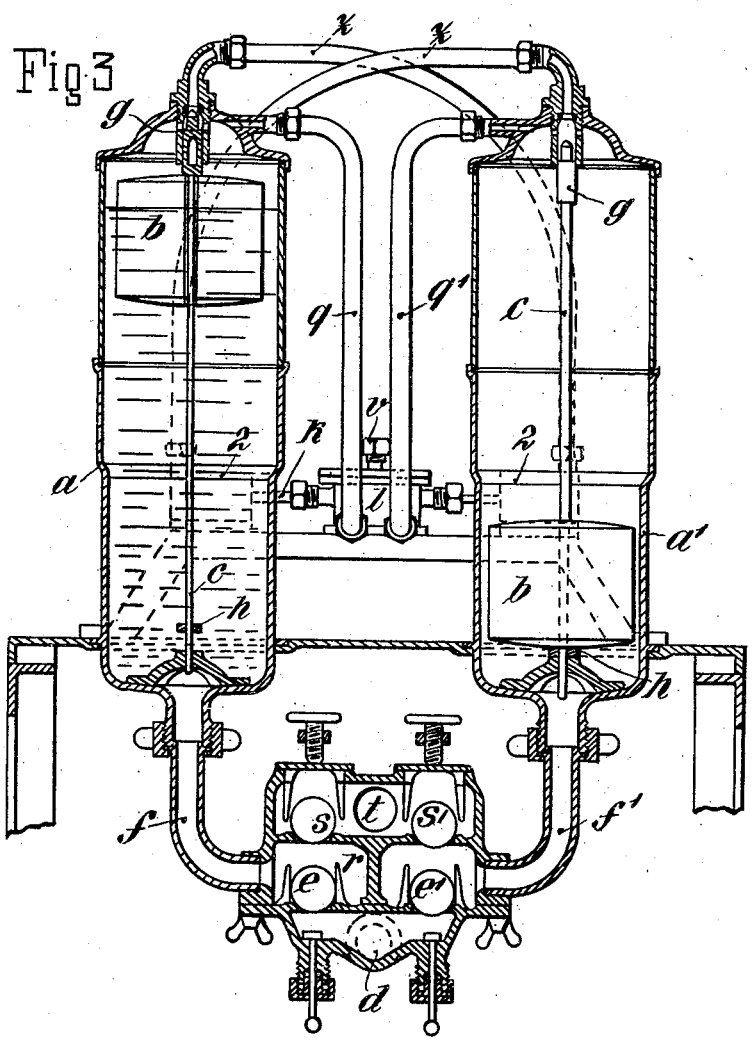

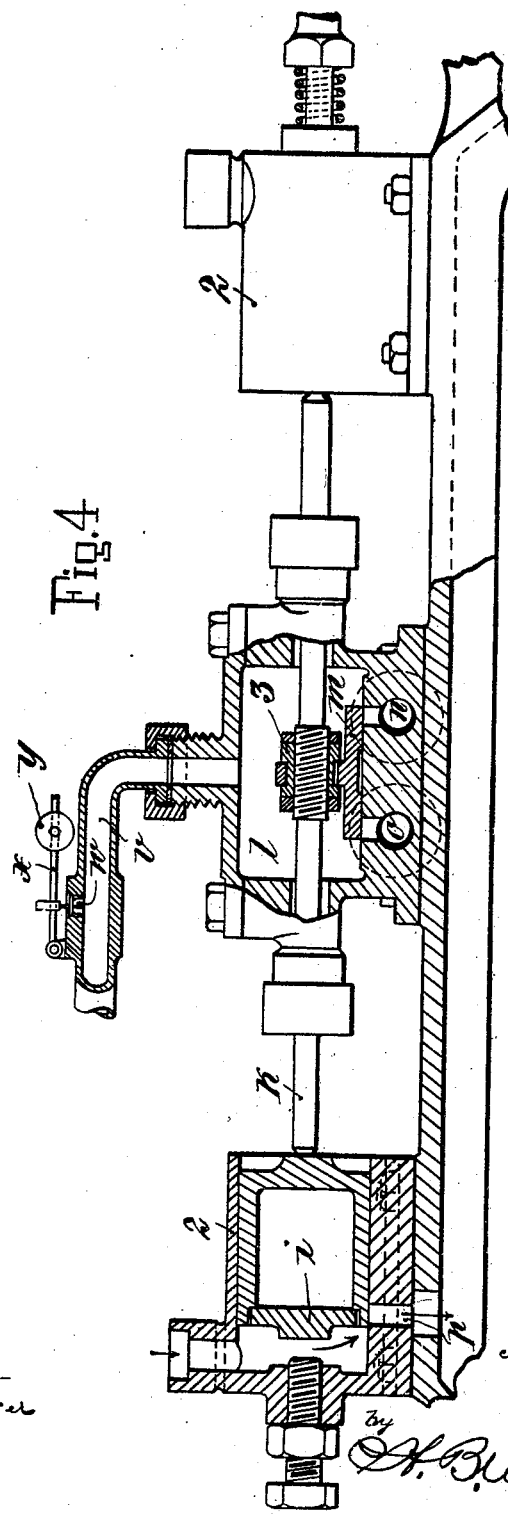

UNITED STATES PATENT OFFICE.

JOHN HENRY WILLIAM ORTMANN AND CARL WILHELM CORNELIUS HERBST, OF HAMBURG, GERMANY.

DEVICE FOR RAISING AND CONVEYING BEER FROM STORAGE VESSELS BY THE DIRECT INFLUENCE OF AIR-PRESSURE OF VARIABLE STRENGTH.

No. 925,219.  Specification of Letters Patent.  Patented June 15, 1909.

Application filed December 4, 1906. Serial No. 346,209.

*To all whom it may concern:*

Be it known that we, JOHN HENRY WILLIAM ORTMANN and CARL WILHELM CORNELIUS HERBST, residing at the freetown of Hamburg, in the State of Hamburg, Gothenstrasse 9, Germany, have invented a new and useful Improvement in Devices for Raising and Conveying Beer from Storage Vessels by the Direct Influence of Air-Pressure of Variable Strength, of which the following is a specification.

The invention has reference to a device for raising and conveying beer from storage vessels by the direct influence of air pressure of variable strength.

Among other objects the invention provides for the change of pressure which takes place in the socalled pressure regulators being brought about not suddenly but gently and gradually so as to avoid producing an unfavorable effect on the beer. It is therefore a question of securing the beer against sudden and violent shocks and allowing the pressure to be put on and taken off gently and gradually. This is effected by a suitable arrangement and working of the valves and outlets in the pressure regulator.

In order that our invention may be readily understood we have appended hereunto three sheets of drawings, showing various suitable devices of this kind.

Figure 1 gives a side view of such a device in partial section. Fig. 2 is a plan. Fig. 3 is a section through the two pressure changing vessels of the apparatus and Fig. 4 a section through the slide valve of the apparatus on a larger scale.

The two pressure changing vessels $a$ and $a^1$ through which the beer passes alternately are arranged on a portable frame and are provided at their lower ends with pipes $f$ and $f^1$ (Fig. 3) finishing in a box where on the one side they are connected with the common inlet pipe $d$ and on the other side with the common beer outlet pipe $t$. In the coupling box, valves $e$ and $e^1$ are provided for the inlet and $s$ $s^1$ for the outlet.

At the upper end the pressure changing vessels are provided with openings to which are attached the air outlet pipes $z$. Moreover there are at the upper end of these vessels the entrances of air pressure inlet pipes $q$ and $q^1$.

In each of the vessels $a$ and $a^1$ there is a floating weight $b$ (Fig. 3). These floating weights are arranged to slide on movable rods $c$. The movable rods $c$ have on their upper ends valve plugs $g$ which serve to close the air outlet pipes $z$.

The air pressure outlet pipes $z$ lead to the cylinders 2 of a slide valve (Figs. 2 and 4). In these cylinders are sliding pistons $i$ which are connected with the slide rod $k$. This slide rod $k$ passes through the valve box $l$. Into this there opens on the one side the pipe $v$ from the air pressure pump or pumps while on the other side outlets $o$ and $n$ are provided in it which pass into the pipes $q$ and $q^1$. Moreover a slide $m$ is provided inside the box, the sliding of which opens and closes alternately the ways $o$ and $n$. The slide rod $k$ is in the inside of the box provided with a collar 3, by which the slide $m$ is kept in connection with the rod $k$.

In the cylinders 2 outlets $p$ are placed beyond the openings of the pipes $z$ for the compressed air through which the latter can pass off to the atmosphere after its work is done.

In the cylinder pipe $v$ for the compressed air a safety valve $w$ is provided which by means of a weight $y$ sliding on the lever $x$ can be adjusted to a fixed pressure.

The common outlet pipe $t$ for the beer leads into a glass vessel $u$ which is provided with a pressure gage 30 and serves for indicating the flow of the beer and for measuring the pressure. From this vessel the beer passes through the pipe 31 into the conveyer pipe by which it is taken where required. The pipe 31 which opens at the lowest place in the vessel $u$ is kept open by a ball float 32.

The method of working the apparatus is as follows: At the position of the several parts shown in the drawing, the pressure changing vessel $a$ is to be understood as being nearly full of liquid, while the pressure changing vessel $a^1$ is correspondingly empty. In consequence of this the floating weight $b$ of the vessel $a$ is at the upper end of the vessel and presses the valve plug $g$ against its seat by which means the air outlet pipe $z$ which leads to the slide valve is closed. On the other hand the weight $b$ in the vessel $a^1$ presses on the projection $h$ near the lower end of the rod $c$ and thereby presses down the rod $c$ and removes the valve plug $g$ from its seat. In consequence of this the interior of the vessel $a^1$ comes into communication with the pipe $z$ and the cylinder 2 of the slide valve. By this means the slide $m$ of the valve box $l$ is brought into such a position that the compressed air introduced through the pipe $v$ can reach the vessel $a$ through the pipe $q$. As a consequence the beer is forced out of the vessel $a$ through the pipes $f$ and $t$ into the glass $u$ and on into the conveyer pipe 31. This makes the floating weight $b$ sink gently and press at the end of its movement against the projection $h$ on the rod $c$. It is now limited in its downward movement while the surface of the liquid in the vessel goes on gently sinking. Owing to this further sinking of the surface of the liquid, the floating weight comes more and more out of the liquid and in the same proportion its own weight makes itself more and more felt. At the moment when the apparent weight of the float resting on the rod $c$ has so far increased that it has become greater than the product of the value of the air pressure prevailing in the interior of the vessel and the value of the end surface of the valve plug $g$ which faces toward the interior of the vessel, the plug is forced away from its seat and the rod $c$ descends. Then the compressed air from the pressure changing vessel $a$ can pass off and through the pipe $z$ gets to the back of the piston $i$ of the slide valve while the remainder of the beer leaves the vessel $a$ with retarded flow. The compressed air which gets behind the piston $i$ causes it to slide and also the valve rod which works in conjunction with it. This makes the slide $m$ in the box $l$ move so far that the way $o$ for the pipe $q$ is completely closed and the way $n$ for the pipe $q^1$ is fully open. At the same time owing to the sliding of the piston $i$ the outlet opening $p$ is uncovered so that the compressed air passing off from the pressure changing vessel $a$ can now escape into the open. After this change in the valve is effected the compressed air brought in through the pipe $v$ flows through the way $n$ and the pipe $q$ into the vessel $a^1$. During the proceedings just described this has again been filled up with beer which begins to flow in from the storage vessel under a slight excess of pressure of, for example 4/10 atmospheres as soon as the pressure in the corresponding pressure changing vessel has sunk low enough after the opening of the air outlet pipe $z$. As the pressure in the changing vessel decreases gradually the incoming of the beer begins slowly and goes on gradually so that the occurrence of undesirable shocks to the beer which may influence its quality is avoided. In the same way the incoming of the beer into the changing vessel ends gradually as soon as the valve $g$ is pressed against the air outlet opening by the floating weight $b$ and only ceases when the air above the beer in the pressure changing vessel has been compressed to correspond to the excess of pressure of 4/10 atmospheres. To force the beer out of the changing vessel a pressure of for instance 4 atmospheres may be used. This firstly diminishes when the outward flow of the beer comes to an end because the valve $g$ is forced open by the weight $b$ and the pipe $z$ can become filled with compressed air before the valve $m$ moves owing to the sliding of the piston $i$ and the outlet way $p$ is left open.

The adjustable safety valve $w$ in the pipe $v$ has the effect of preventing any undue increase in pressure in the air compressor from being transmitted to the pressure changing vessel by making it pass off through this valve shortly before entering into the valve box. If a valve of this kind were not provided there would be the danger of the beer being forced violently and with much froth out of the changing vessel on account of the increased pressure. The method of inserting this safety valve may of course be varied. For instance, the weight may be replaced by a spring capable of being adjusted by a screw or any like device.

Having now particularly described and ascertained the nature of our said invention, and in what manner the same is to be performed, we declare that what we claim is:

1. In a beer raising device, the combination of two vessels arranged parallel to each other and having air exhaust pipes, pipes for alternately conducting the beer from a storage vessel into said parallel vessels, and for conveying the beer from said parallel vessels, floating weights in said vessels, a valve box having a compressed air inlet and a plurality of air outlets, pipes connecting the air outlets of said valve box with said vessels, a sliding valve in said box arranged to close said air outlets, a piston rod extending through said valve box and connected intermediately of its ends to said valve, cylinders disposed adjacent said box into which the ends of said rod extend, pistons on the opposite ends of said rod arranged to operate in said cylinders, means for controlling said pistons operated by the falling of the floating weights said cylinders having openings connected with the air exhaust pipes of said vessels, and said cylinders having air outlet openings disposed in advance of the openings to which the vessel exhaust pipes are connected.

2. In a beer raising device, the combination of two vessels arranged parallel to each other and having air exhaust pipes, pipes for alternately conducting the beer from the storage vessel into said parallel vessels, pipes for conveying the beer from said parallel vessels, floating weights in said vessels, a valve box having a compressed air inlet, a plurality of air outlet pipes connecting the air outlets of said valve box with said vessels, a sliding valve in said box arranged to close said air outlets, a piston rod extending through said box and connected intermediately of its ends to said valve, and means operated by the air from the exhaust pipes of said vessels for moving said rod in opposite directions to open and close the air outlets of said valve box alternately on the downward movement of said floating weights in said vessel.

In testimony whereof we have hereunto set our hands in presence of two subscribing witnesses.

JOHN HENRY WILLIAM ORTMANN.
CARL WILHELM CORNELIUS HERBST.

Witnesses:
ERNEST H. L. MUMMENHOFF,
OTTO W. HELLENISCH.